United States Patent
Hong et al.

(10) Patent No.: US 9,001,101 B2
(45) Date of Patent: Apr. 7, 2015

(54) LIQUID CRYSTAL DISPLAY DEVICE AND METHOD OF DRIVING THE SAME

(75) Inventors: Kwang-Pyo Hong, Gumi-si (KR); Jong-Hyun Lee, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 287 days.

(21) Appl. No.: 13/338,819

(22) Filed: Dec. 28, 2011

(65) Prior Publication Data

US 2012/0242640 A1  Sep. 27, 2012

(30) Foreign Application Priority Data

Mar. 21, 2011 (KR) .................. 10-2011-0024823

(51) Int. Cl.
*G09G 5/00* (2006.01)
*G09G 3/36* (2006.01)
*G02F 1/1362* (2006.01)

(52) U.S. Cl.
CPC ........ *G02F 1/136213* (2013.01); *G09G 3/3614* (2013.01); *G09G 3/3648* (2013.01); *G02F 2201/121* (2013.01); *G09G 2300/0426* (2013.01)

(58) Field of Classification Search
None
See application file for complete search history.

(56) References Cited

U.S. PATENT DOCUMENTS

| 5,808,706 | A | 9/1998 | Bae | |
| 6,256,076 | B1 * | 7/2001 | Bae et al. | 349/38 |
| 2008/0001902 | A1 | 1/2008 | Kim | |
| 2012/0182489 | A1 * | 7/2012 | Wang et al. | 349/38 |

FOREIGN PATENT DOCUMENTS

GB  2431279 A  4/2007

OTHER PUBLICATIONS

Office Action issued in corresponding United Kingdom Patent Application No. GB1122012.6, mailed Apr. 23, 2012.

* cited by examiner

*Primary Examiner* — Christopher R Lamb

(74) *Attorney, Agent, or Firm* — Brinks Gilson & Lione

(57) ABSTRACT

A liquid crystal display device includes: a plurality of gate and data lines crossing each other on a substrate to define a plurality of pixels; a thin film transistor in each pixel region and connected to the corresponding gate and data lines; a pixel electrode in each pixel region and connected to a drain electrode of the thin film transistor; and an opposing electrode that forms a capacitor in each pixel along with the pixel electrode, wherein the pixel electrode of a pixel at a $n^{th}$ row line and a $m^{th}$ column line is connected to the opposing electrode of a neighboring pixel along the $m^{th}$ column line or along the $n^{th}$ row line.

8 Claims, 10 Drawing Sheets

LIQUID CRYSTAL DISPLAY DEVICE AND METHOD OF DRIVING THE SAME

This application claims the priority and the benefit under 35 U.S.C. §119(a) on Korean Patent Application No. 10-2011-0024823, filed in Korea on Mar. 21, 2011, the entire contents of which are hereby incorporated by reference.

BACKGROUND

1. Field of the Invention

The present disclosure relates to a liquid crystal display device, and more particularly, to a liquid crystal display device and a method of driving the same.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

The LCD devices are categorized into TN (twisted nematic) mode LCD devices, VA (vertical alignment) mode LCD devices, and IPS (in-plane switching) mode LCD devices. Of theses LCD devices, the IPS mode LCD devices have an advantage of wide viewing angles. The IPS mode LCD device has a liquid crystal layer operated by an in-plane electric field.

FIG. 1 is a circuit diagram of a pixel of an LCD device according to the related art.

Referring to FIG. 1, the LCD device includes gate and data lines GL and DL crossing each other to define a pixel region. In the pixel region, a thin film transistor T connected to the gate and data lines GL and DL, and a storage capacitor Cst and a liquid crystal capacitor Clc connected to the thin film transistor T are formed. The liquid crystal capacitor Clc includes a pixel electrode, a common electrode and a liquid crystal layer therebetween. The pixel electrode is connected to a drain electrode of the thin film transistor T.

When a pixel voltage and a common voltage are applied to the pixel electrode and the common electrode, respectively, an electric field is induced between the pixel and common electrodes and operates the liquid crystal layer. The storage capacitor Cst functions to storage the pixel voltage.

FIG. 2 is a schematic view illustrating an LCD device according to the related art.

Referring to FIG. 2, the LCD device includes a plurality of gate lines GLn−1, GLn and GLn+1 and a plurality of data lines DLm−1, DLm and DLm+1 to define pixel regions arranged in a matrix form.

In the pixel region, a thin film transistor T connected to the corresponding gate and data lines and a storage capacitor Cst connected to the thin film transistor T are formed. An electrode of the storage capacitor Cst is connected to a drain electrode of the thin film transistor T, and another electrode of the storage capacitor Cst is connected to a common line.

The LCD device is operated in a line inversion method or a dot inversion method. To do this, a common voltage is inverted in polarity per frame in synchronization with a gate signal and applied to the corresponding common line.

FIG. 3A is a plan view illustrating an array substrate of an LCD device according to the related art, and FIG. 3B is a cross-sectional view taken along a line III-III of FIG. 3A.

Referring to FIGS. 3A and 3B, the array substrate includes gate and data lines 12 and 22 on a substrate 10 crossing each other to define a pixel region. A gate insulating layer 13 is between the gate and data lines 12 and 22. In the pixel region, a thin film transistor T connected to the gate and data lines 12 and 22 is formed. The thin film transistor includes a gate electrode 11, a semiconductor layer 15, and source and drain electrodes 17 and 19.

A pixel electrode 20 is formed in the pixel region P and connected to the drain electrode 19 of the thin film transistor T. The pixel electrode 20 is formed on the gate insulating layer 13, and spaced apart from the data line 22 to prevent a short circuit with the data line 22.

A passivation layer 24 is formed on the data line 22 and the pixel electrode 20. A common electrode 26 is formed on the passivation layer 24 corresponding to the pixel electrode 20 and includes a plurality of bar-shaped openings OA.

When a gate signal and a data signal are applied to the gate and data lines 12 and 22, respectively, the thin film transistor T is turned on according to the gate signal, and the data signal passes through the thin film transistor T and is applied to the pixel electrode 20 as a pixel voltage. When a common voltage is applied to the common electrode 26, an electric field induced by the pixel voltage and the common voltage operates a liquid crystal layer.

FIGS. 4A and 4B are views illustrating waveforms of pixel and common voltages in a line inversion method and a pixel inversion method, respectively, according to the related art.

Referring to FIG. 4A, in the line inversion method, a pixel voltage Vdata is inverted in polarity per line and per frame according to a polarity control signal that is generated from a timing control portion. A common voltage Vcom is inverted in polarity opposite to the pixel voltage Vdata.

For example, further referring to FIG. 2, a pixel region at a coordinate (n−1, m−1) is supplied with a data voltage Vdata of a positive polarity (+) while a pixel region at a coordinate (n, m−1) is supplied with a data voltage Vdata of a negative polarity (−). In this case, the pixel region at (n−1, m−1) is supplied with a common voltage Vcom of a negative polarity (−) while the pixel region at (n, m−1) is supplied with a common voltage Vcom of a positive polarity (+).

Referring to FIG. 4B, in the pixel inversion method, a common voltage Vcom is constant while a pixel voltage Vdata is inverted in polarity with respect to the common voltage Vcom.

In the related art LCD device operated in the above inversion methods, a common voltage supply portion is used to supply the common voltage to all pixel regions. In this case, since the common voltage is supplied to all pixel regions, power consumption increases.

BRIEF SUMMARY

A liquid crystal display device includes: a plurality of gate and data lines crossing each other on a substrate to define a plurality of pixels; a thin film transistor in each pixel region and connected to the corresponding gate and data lines; a pixel electrode in each pixel region and connected to a drain electrode of the thin film transistor; and an opposing electrode that forms a capacitor in each pixel along with the pixel electrode, wherein the pixel electrode of a pixel at a $n^{th}$ row line and a $m^{th}$ column line is connected to the opposing electrode of a neighboring pixel along the $m^{th}$ column line or along the $n^{th}$ row line.

In another aspect, a method of driving a liquid crystal display device includes sequentially applying a gate signal to a plurality of gate lines to turn on a thin film transistor connected to the gate line applied with the gate signal, wherein the thin film transistor is in each of a plurality of pixels that are defined by the plurality of gate lines and a plurality of data lines crossing each other; and applying a pixel voltage to a pixel electrode of the pixel through the data line when the thin film transistor is turned on, wherein an opposing electrode forms a capacitor in each pixel along with the pixel electrode, and wherein the pixel electrode of a pixel at a $n^{th}$ row line and a $m^{th}$ column line is connected to the opposing electrode of a neighboring pixel along the $m^{th}$ column line or along the $n^{th}$ row line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to the illustrated embodiments of the present invention, which are illustrated in the accompanying drawings.

Figure 1:
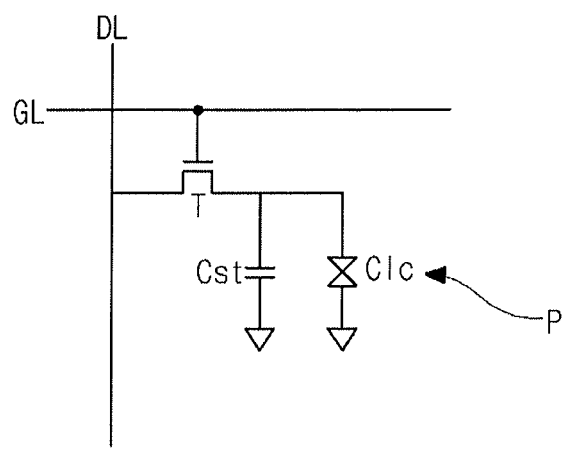
FIG. 1 is a circuit diagram of a pixel of an LCD device according to the related art.
Figure 2:
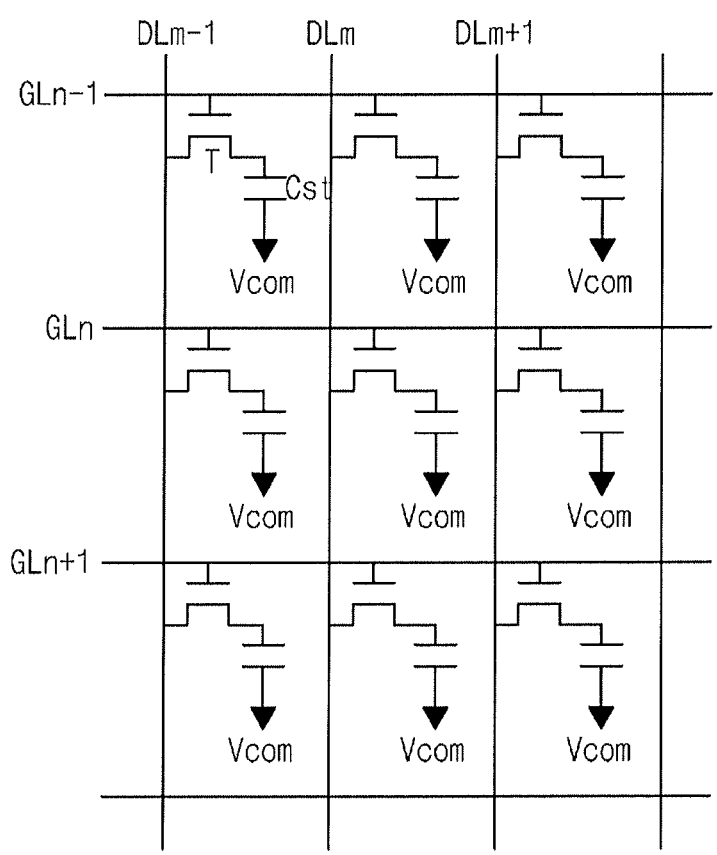
FIG. 2 is a schematic view illustrating an LCD device according to the related art.
Figure 3A:
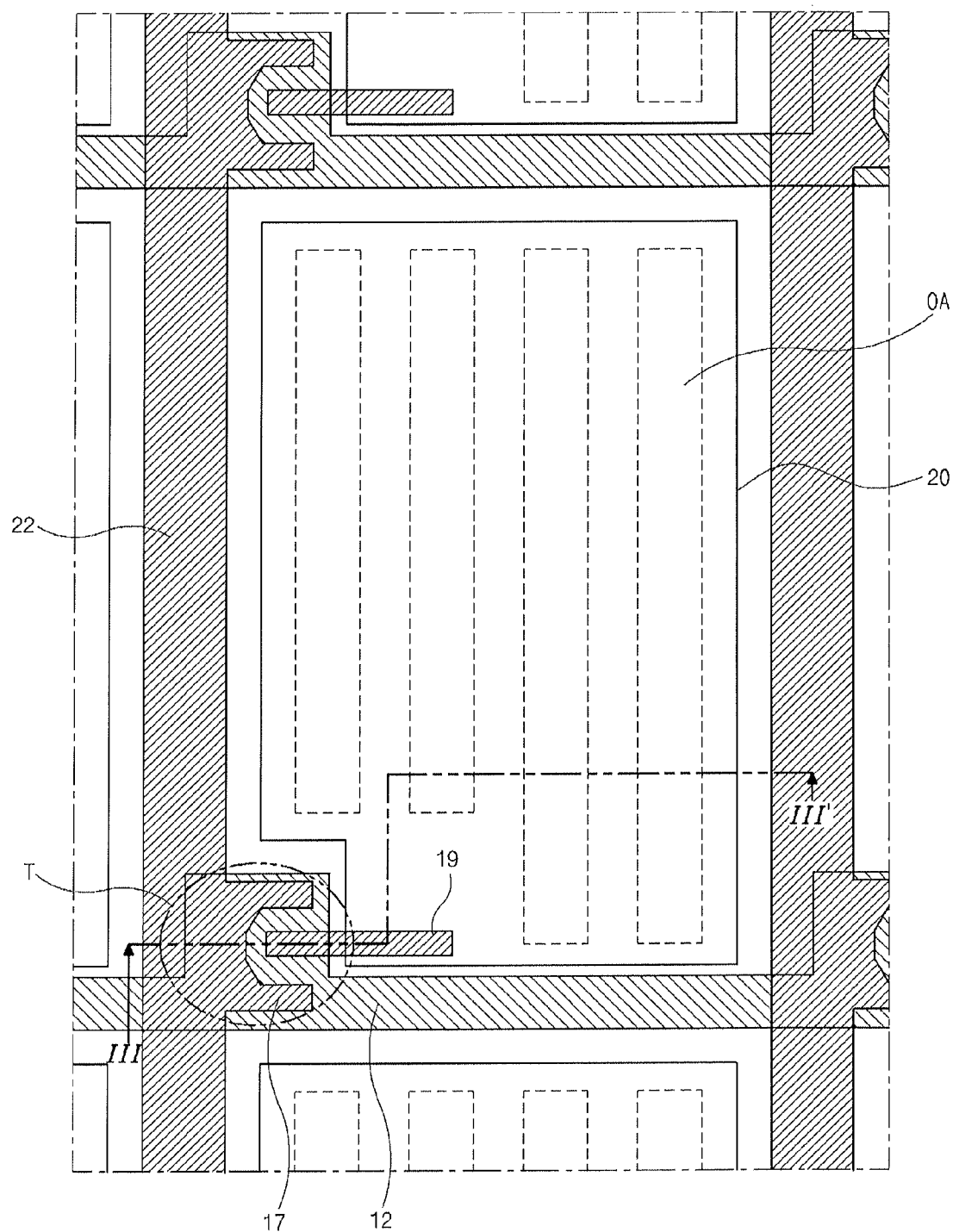
FIG. 3A is a plan view illustrating an array substrate of an LCD device according to the related art.
Figure 3B:
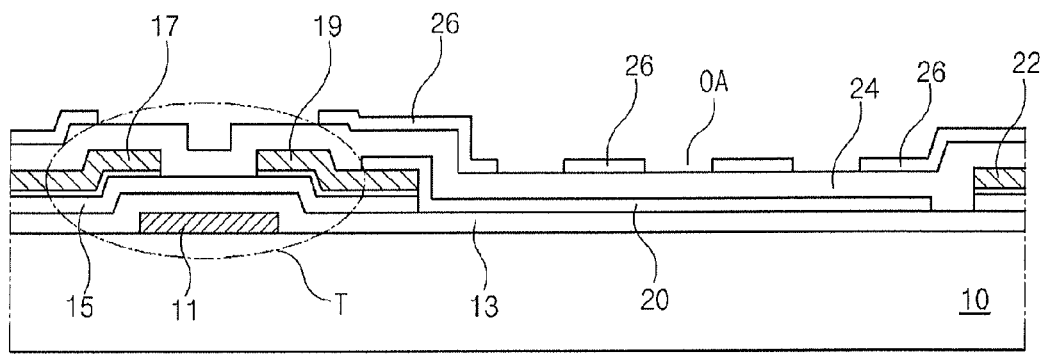
FIG. 3B is a cross-sectional view taken along a line of FIG. 3A.
Figure 4A:
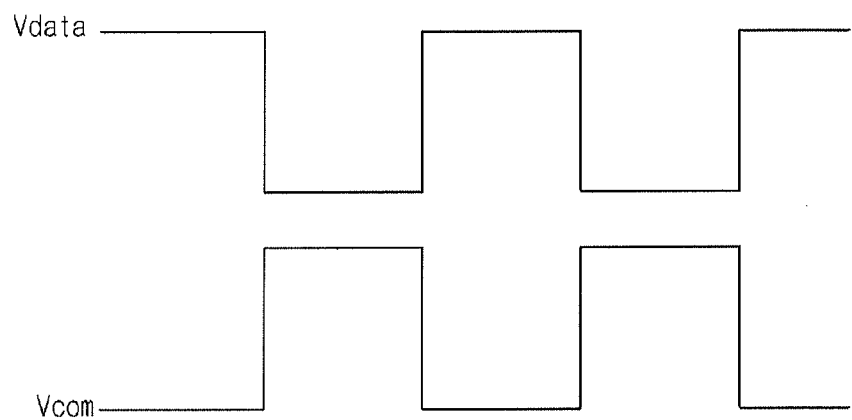
FIGS. 4A and 4B are views illustrating waveforms of pixel and common voltages in a line inversion method and a pixel inversion method, respectively, according to the related art.
Figure 4B:
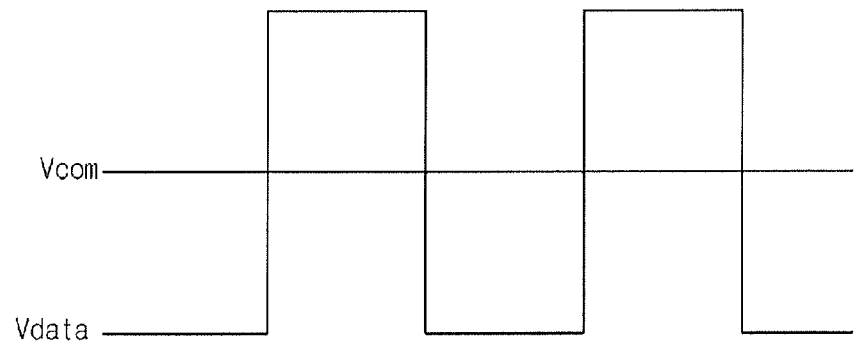
Figure 5:
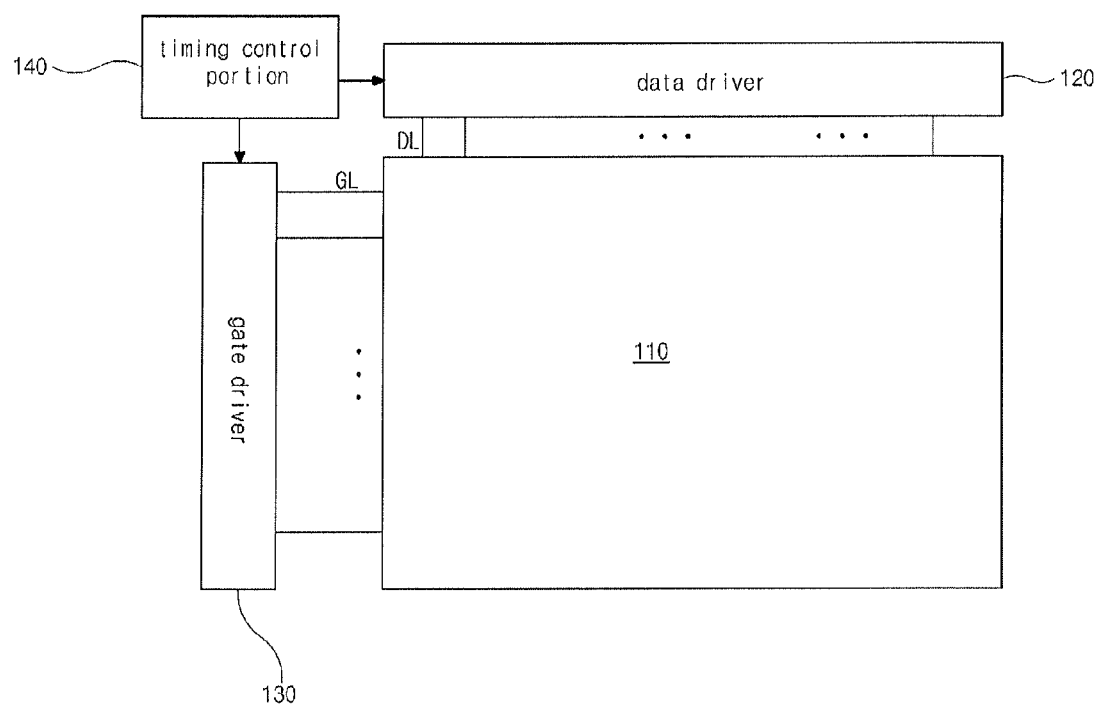
FIG. 5 is a schematic view illustrating an LCD device according to a first embodiment of the present invention.
Figure 6:
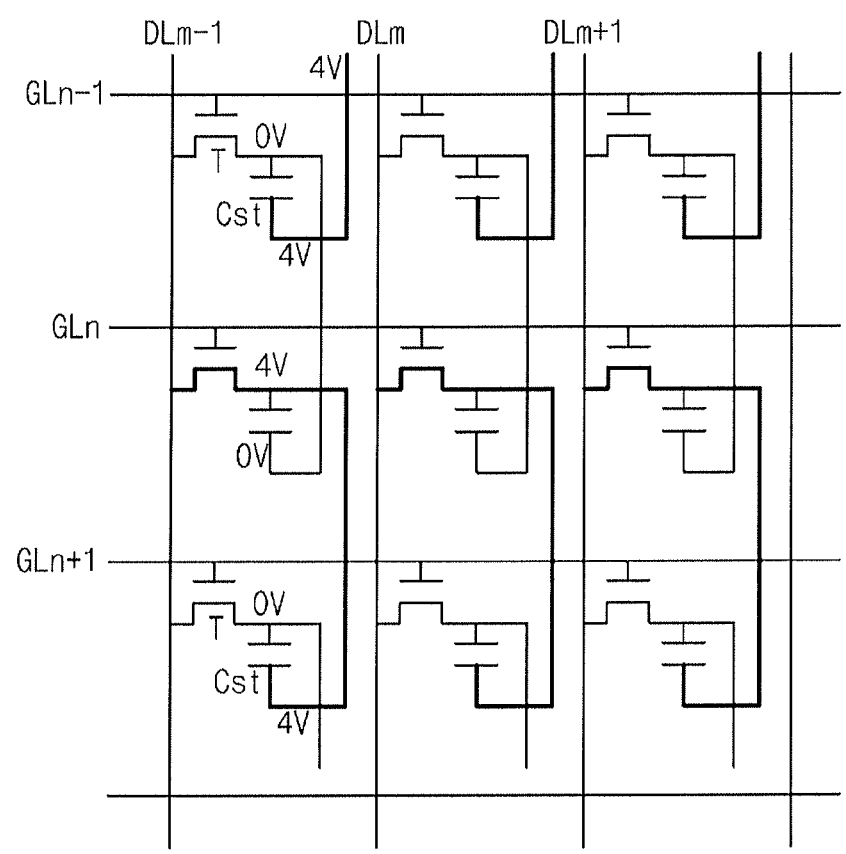
FIG. 6 is a circuit diagram illustrating the LCD device according to the first embodiment of the present invention.

FIG. 5 is a schematic view illustrating an LCD device according to a first embodiment of the present invention, and FIG. 6 is a circuit diagram illustrating the LCD device according to the first embodiment of the present invention.

Referring to FIGS. 5 and 6, the LCD device 100 includes a liquid crystal panel 110 including a plurality of pixel regions P, a data driver 120 to operate a plurality of data lines DL, a gate driver 130 to operate a plurality of gate lines GL, and a timing control portion 140 to control the data and gate drivers 120 and 130.

The liquid crystal panel 110 includes the gate and data lines GL and DL crossing each other to define the pixel regions P in a matrix type, for example, N*M matrix type.

A thin film transistor T in the pixel region P is turned on according to a gate signal supplied through the gate line GL, and a data signal is applied to the pixel region.

The data driver 120 outputs the data signal to the data line DL using data control signals. The data driver 120 may include a data calculation portion that calculates a data voltage of a pixel located at a next row line (e.g., a $(n+1)^{th}$ row line) using a data voltage of a pixel located at a row line (e.g., a $n^{th}$ row line).

The gate driver 130 generates the gate signal and outputs it to the gate line GL using gate control signals.

The timing control portion 140 receives image data signals and control signals such as vertical and horizontal synchronization signals, a data enable signal, a data clock and the like from a system such as a video card, and generates the gate control signals and the data control signals. The timing control portion 140 processes and outputs the image data signals to the data driver 120.

Referring to FIG. 6, for the purpose of explanations, gate lines GLn−1 to GLn+1, data lines DLm−1 to DLm+1, and pixels defined by the gate and data lines are shown.

Each pixel includes a thin film transistor T connected to the corresponding gate and data lines, and a storage capacitor Cst. An electrode (i.e., a pixel electrode) of two electrodes of the storage capacitor Cst is connected to the thin film transistor T. The other electrode (i.e., an opposing electrode) of the storage capacitor Cst is connected to an electrode (i.e., a pixel electrode) of a pixel at a previous or next row line and at the same column line. In this embodiment, for the purposes of explanation, the opposing electrode of the storage capacitor Cst is connected to the pixel electrode of the pixel at the previous row line.

Accordingly, when a pixel voltage is applied to a pixel electrode of a pixel, the pixel voltage is applied to an opposing electrode of a pixel at a next row line and stored, and, in this manner, pixels along the same column line are sequentially connected.

While the related art uses a common voltage separately for a common electrode of each pixel, this embodiment uses a pixel voltage applied to a pixel (e.g., a pixel at (n, m)) as a voltage applied to an opposing electrode of a pixel at a next row line (e.g., a pixel at (n+1, m)). Accordingly, a separate common voltage is not needed, and this can greatly reduce power consumption.

Figure 7A:
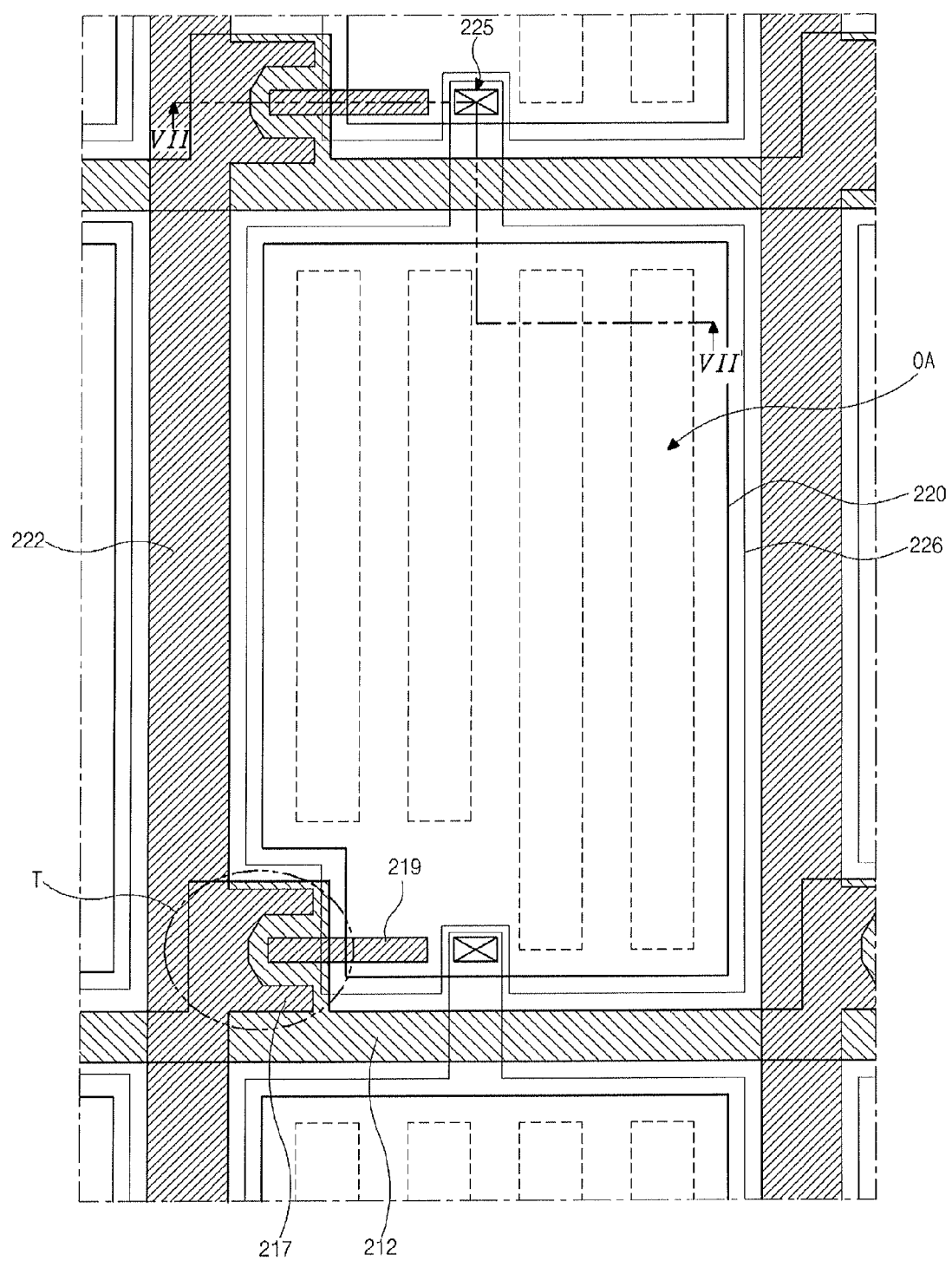
FIG. 7A is a plan view illustrating an array substrate of an LCD device according to the first embodiment of the present invention.
Figure 7B:
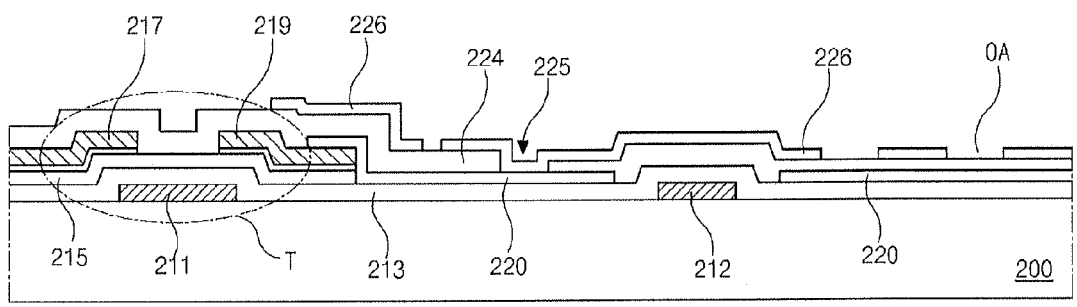
FIG. 7B is a cross-sectional view taken along a line VII-VII of FIG. 7A.

FIG. 7A is a plan view illustrating an array substrate of an LCD device according to the first embodiment of the present invention, and FIG. 7B is a cross-sectional view taken along a line VII-VII of FIG. 7A.

Referring to FIGS. 7A and 7B, the array substrate includes gate and data lines 212 and 222 on a substrate 200 to define a pixel region, and a gate insulating layer 213 is between the gate and data lines 212 and 222. In the pixel region, a thin film transistor T connected to the gate and data lines 212 and 222 is formed. The thin film transistor T includes a gate electrode 211, a semiconductor layer 215 and source and drain electrodes 217 and 219.

A pixel electrode 220 may be formed on the gate insulating layer 213 in the pixel region and connected to the drain electrode 219 of the thin film transistor T. The pixel electrode 220 is spaced apart from the data line 222 to prevent a short circuit with the data line 222. The pixel electrode 220 may be made of a transparent conductive material, for example, indium-tin-oxide (ITO), indium-zinc-oxide (IZO), or indium-tin-zinc-oxide (ITZO).

A passivation layer 224 is formed on the data line 222 and the pixel electrode 220. The passivation layer 224 is made of an insulating material.

An opposing electrode 226 is formed on the passivation layer 224 corresponding to each pixel region. The opposing electrode 226 has a plurality of bar-shaped openings OA in the pixel region.

Further, the opposing electrode 226 may be connected to the pixel electrode 220 of a pixel region at a previous row line and at the same column line. For example, the opposing electrode 226 has an extension portion that extends over the pixel region at the previous row line and contacts the pixel electrode 220 of the pixel region at the previous row line through a contact hole 225. The contact hole 225 is formed in the passivation layer 224 and exposes the pixel electrode 220.

As described above, in the first embodiment, a pixel electrode of a pixel is connected to an opposing electrode of a neighboring pixel along a column line. Accordingly, when the pixel is turned on and applied to a pixel voltage, this pixel voltage is applied to the opposing electrode of the neighboring pixel as a common voltage, and this manner are made along the column line. Therefore, the opposing electrode of each pixel can be applied with the pixel voltage from its neighboring pixel as an opposing voltage without using a separate common voltage.

A second embodiment of the present invention is explained as follows. The second embodiment of the present invention has a configuration similar to that of the first embodiment except for a relationship between neighboring pixels. Accordingly, explanations of parts similar to parts of the first embodiment may be omitted.

Figure 8:
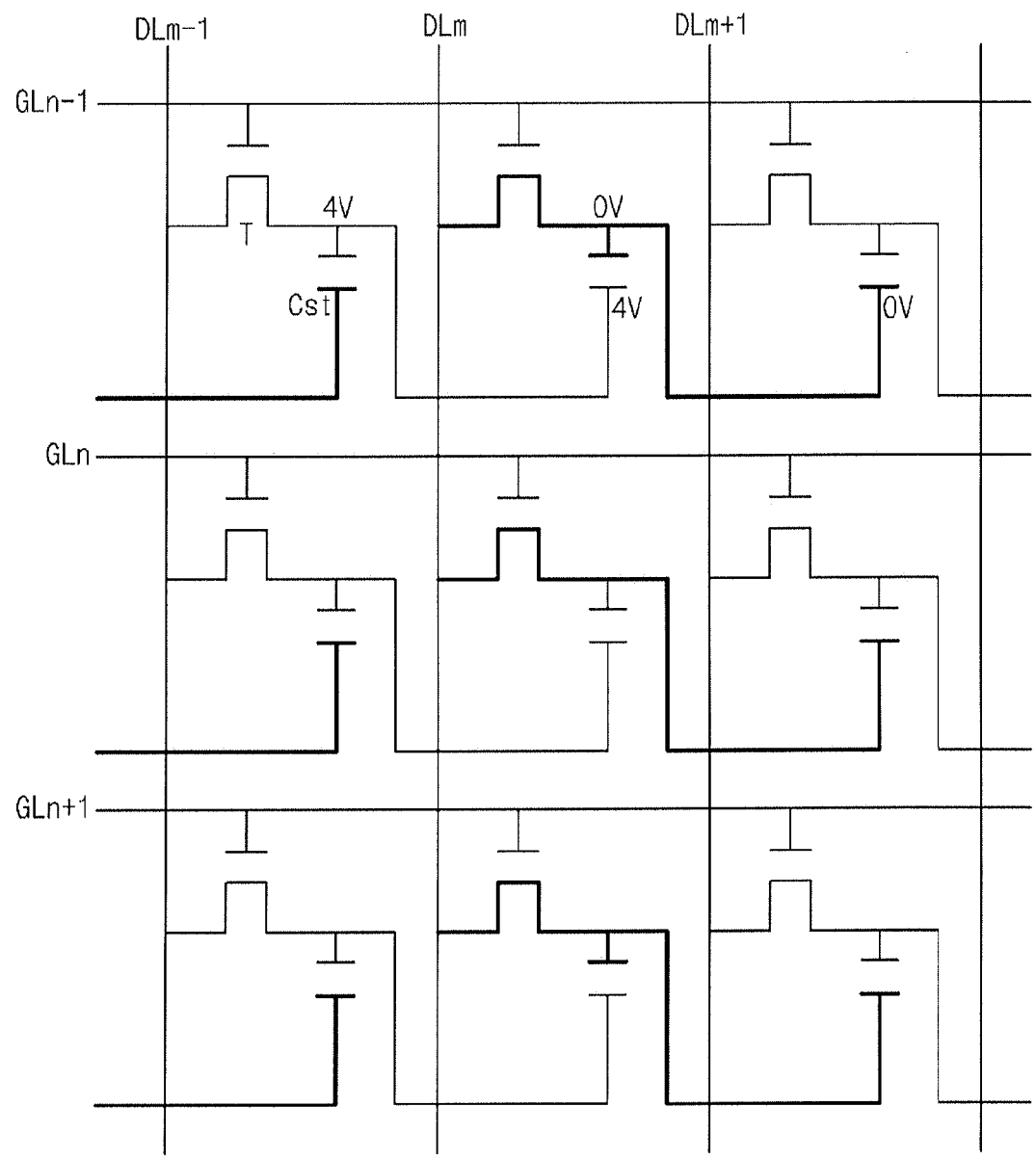
FIG. 8 is a circuit diagram illustrating the LCD device according to the first embodiment of the present invention.

FIG. 8 is a circuit diagram illustrating the LCD device according to the first embodiment of the present invention.

Referring to FIG. 8, for the purpose of explanations, gate lines GLn−1 to GLn+1, data lines DLm−1 to DLm+1, and pixels defined by the gate and data lines are shown.

Each pixel includes a thin film transistor T connected to the corresponding gate and data lines, and a storage capacitor Cst. An electrode (i.e., a pixel electrode) of two electrodes of the storage capacitor Cst is connected to the thin film transistor T. The other electrode (i.e., an opposing electrode) of the storage capacitor Cst is connected to an electrode (i.e., a pixel electrode) of a pixel at a previous or next column line and at the same row line. In this embodiment, for the purposes of explanation, the opposing electrode of the storage capacitor Cst is connected to the pixel electrode of the pixel at the previous column line.

Accordingly, when a pixel voltage is applied to a pixel electrode of a pixel, the pixel voltage is applied to an opposing electrode of a pixel at a next column line and stored, and, in this manner, pixels along the same row line are sequentially connected.

While the related art uses a common voltage separately for a common electrode of each pixel, this embodiment uses a pixel voltage applied to a pixel (e.g., a pixel at (n, m)) as a voltage applied to an opposing electrode of a pixel at a next column line (e.g., a pixel at (n, m+1)). Accordingly, a separate common voltage is not needed, and this can greatly reduce power consumption.

Figure 9A:
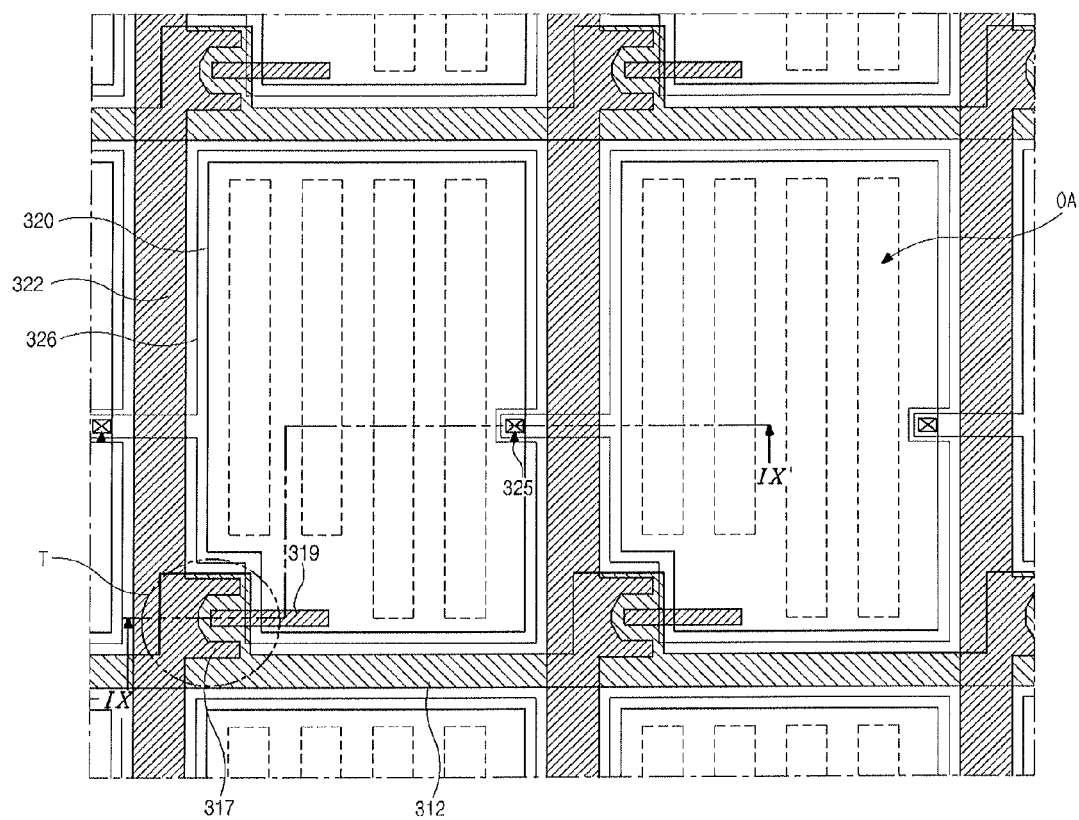
FIG. 9A is a plan view illustrating an array substrate of an LCD device according to the second embodiment of the present invention.
Figure 9B:
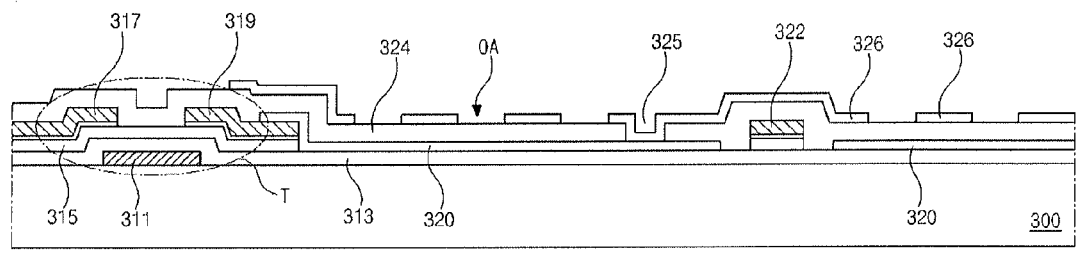
FIG. 9B is a cross-sectional view taken along a line IX-IX of FIG. 9A.

FIG. 9A is a plan view illustrating an array substrate of an LCD device according to the second embodiment of the present invention, and FIG. 9B is a cross-sectional view taken along a line IX-IX of FIG. 9A.

Referring to FIGS. 9A and 9B, the array substrate includes gate and data lines 312 and 322 on a substrate 300 to define a pixel region, and a gate insulating layer 313 is between the gate and data lines 312 and 322. In the pixel region, a thin film transistor T connected to the gate and data lines 312 and 322 is formed. The thin film transistor T includes a gate electrode 311, a semiconductor layer 315 and source and drain electrodes 317 and 319.

A pixel electrode 320 may be formed on the gate insulating layer 313 in the pixel region and connected to the drain electrode 319 of the thin film transistor T. The pixel electrode 320 is spaced apart from the data line 322 to prevent a short circuit with the data line 322. The pixel electrode 320 may be made of a transparent conductive material, for example, indium-tin-oxide (ITO), indium-zinc-oxide (IZO), or indium-tin-zinc-oxide (ITZO).

A passivation layer 324 is formed on the data line 322 and the pixel electrode 320. The passivation layer 324 is made of an insulating material.

An opposing electrode 326 is formed on the passivation layer 324 corresponding to each pixel region. The opposing electrode 326 has a plurality of bar-shaped openings OA in the pixel region.

Further, the opposing electrode 326 may be connected to the pixel electrode 320 of a pixel region at a previous column line and at the same row line. For example, the opposing electrode 326 has an extension portion that extends over the pixel region at the previous column line and contacts the pixel electrode 320 of the pixel region at the previous column line through a contact hole 325. The contact hole 325 is formed in the passivation layer 324 and exposes the pixel electrode 320.

As described above, in the second embodiment, a pixel electrode of a pixel is connected to an opposing electrode of a neighboring pixel along a row line. Accordingly, when the pixel is turned on and applied to a pixel voltage, this pixel voltage is applied to the opposing electrode of the neighboring pixel as a common voltage, and this manner are made along the row line. Therefore, the opposing electrode of each pixel can be applied with the pixel voltage from its neighboring pixel as an opposing voltage without using a separate common voltage.

Figure 10:
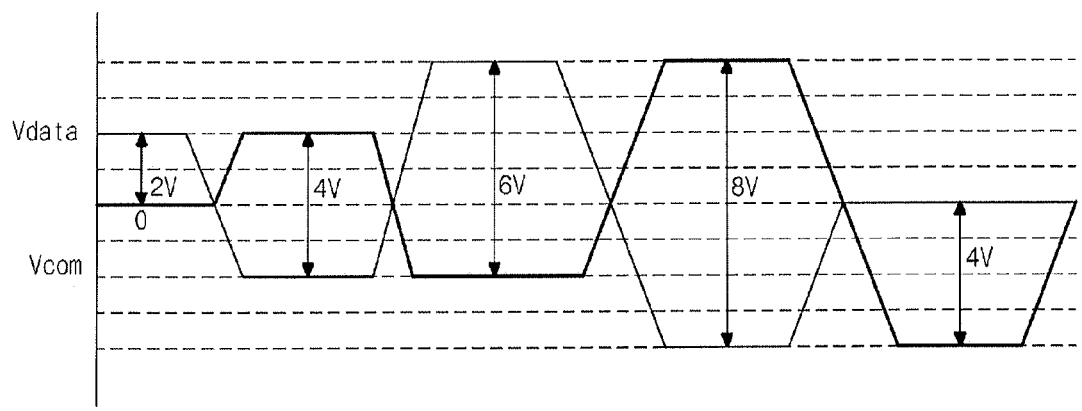
FIG. 10 is a view illustrating waveforms of pixel and opposing voltages of 5 neighboring pixels according to the first or second embodiment of the present invention.

FIG. 10 is a view illustrating waveforms of pixel and opposing voltages of 5 neighboring pixels according to the first or second embodiment of the present invention.

For the purposes of explanation, 5 neighboring pixels i.e., first to fifth pixels connected in cascade manner according to the first or second embodiment have absolute voltage differences between pixel and common voltages thereof, 2V, 4V, 6V, 8V and 4V, respectively. Further, polarity control signals corresponding to the first to fifth pixels have high state, low state, high state, low state and high state, respectively, and the high or low state of the polarity control signal determines a positive or negative polarity of a pixel voltage with respect to an opposing voltage. Further, the first pixel has a pixel voltage of 2V and an opposing voltage of 0V. In FIG. 5, Vdata and Vcom represent a pixel voltage and an opposing voltage, respectively, of each pixel.

In this case, an opposing electrode of the second pixel has an opposing voltage of 2V that is the pixel voltage of the first pixel. Because the voltage difference of the second pixel is 4V, a pixel voltage of −2V, which is got by subtracting 4V from 2V, is applied to the pixel electrode of the second pixel.

Then, an opposing electrode of the third pixel has an opposing voltage of −2V that is the pixel voltage of the second pixel. Because the voltage difference of the third pixel is 6V, a pixel voltage of 4V, which is got by adding −2V to 6V, is applied to the pixel electrode of the third pixel.

Then, an opposing electrode of the fourth pixel has an opposing voltage of 4V that is the pixel voltage of the third pixel. Because the voltage difference of the fourth pixel is 8V, a pixel voltage of −4V, which is got by subtracting 8V from 4V, is applied to the pixel electrode of the fourth pixel.

Then, an opposing electrode of the fifth pixel has an opposing voltage of −4V that is the pixel voltage of the fourth pixel. Because the voltage difference of the fifth pixel is 4V, a pixel voltage of 0V, which is got by adding −4V to 4V, is applied to the pixel electrode of the fifth pixel.

As described above, a pixel voltage applied to a pixel is determined considering a pixel voltage applied to a neighboring pixel, and, to do this, a data calculation portion may be employed in a data driver.

In the above-described embodiments, a pixel voltage applied to a pixel is used as an opposing voltage of a neighboring pixel along a row line or column line. Accordingly, a common voltage and a common voltage supply portion are not needed separately, and power consumption and production cost can be greatly reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A liquid crystal display device, comprising:
    a plurality of gate and data lines crossing each other on a substrate to define a plurality of pixels;
    a thin film transistor in each pixel and connected to the corresponding gate and data lines;
    a pixel electrode in each pixel and connected to a drain electrode of the thin film transistor; and
    an opposing electrode;
    a gate insulating layer on the gate line;
    a semiconductor layer on the gate insulating layer, wherein the data line is on the gate insulating layer;
    a source electrode and the drain electrode on the semiconductor layer; and
    a passivation layer on the data line, the source and drain electrodes, and the pixel electrode, wherein the passivation layer comprises a contact hole that exposes the pixel electrode,
    wherein the pixel electrode of a pixel at a $n^{th}$ row line and a $m^{th}$ column line is connected to the opposing electrode of a neighboring pixel along the $m^{th}$ column line or along the $n^{th}$ row line,
    wherein the opposing electrode is on the passivation layer and includes a plurality of bar-shaped openings,
    wherein the opposing electrode of the neighboring pixel is connected to the pixel electrode of the pixel through the contact hole, and
    wherein the thin film transistor only directly connects with two capacitors: one capacitor in the pixel and the other in the neighboring pixel.

2. The device according to claim 1, further comprising:
    a data driver that outputs a pixel voltage to the data line;
    a gate driver that outputs a gate signal to the gate line; and
    a timing control portion that generates data control signals to control the data driver and gate control signals to control the gate driver.

3. The device according to claim 2, wherein the data driver includes a data calculation portion that calculates the pixel voltage applied to the neighboring pixel using the pixel voltage applied to the pixel.

4. The device according to claim 3, wherein the data calculation portion calculates the pixel voltage applied to the neighboring pixel in a method that adds the pixel voltage of the pixel to an absolute voltage difference between voltages applied to the pixel and opposing electrodes of the neighboring pixel when the neighboring pixel has a positive polarity, and subtracts the absolute voltage of the neighboring pixel from the pixel voltage of the pixel when the neighboring pixel has a negative polarity.

5. The device according to claim 1, wherein at least one pixel is not directly connected to a common voltage supply.

6. A method of driving a liquid crystal display device, the method comprising:
    sequentially applying a gate signal to a plurality of gate lines to turn on a thin film transistor connected to the gate line applied with the gate signal, wherein the thin film transistor is in each of a plurality of pixels that are defined by the plurality of gate lines and a plurality of data lines crossing each other; and
    applying a pixel voltage to a pixel electrode of the pixel through the data line when the thin film transistor is turned on,
    wherein an opposing electrode,
    wherein the pixel electrode of a pixel at a $n^{th}$ row line and a $m^{th}$ column line is connected to the opposing electrode of a neighboring pixel along the $m^{th}$ column line or along the $n^{th}$ row line,
    wherein the liquid crystal display device includes:
    a gate insulating layer on the gate line;
    a semiconductor layer on the gate insulating layer, wherein the data line is on the gate insulating layer;
    a source electrode and a drain electrode on the semiconductor layer; and
    a passivation layer on the data line, the source and drain electrodes, and the pixel electrode, wherein the passivation layer comprises a contact hole that exposes the pixel electrode,
    wherein the opposing electrode is on the passivation layer and includes a plurality of bar-shaped openings,
    wherein the opposing electrode of the neighboring pixel is connected to the pixel electrode of the pixel through the contact hole, and
    wherein the thin film transistor only directly connects with two capacitors: one capacitor in the pixel and the other in the neighboring pixel.

7. The method according to claim 6, wherein the pixel voltage applied to the neighboring pixel is calculated using the pixel voltage applied to the pixel.

8. The method according to claim 7, wherein the pixel voltage applied to the neighboring pixel is a calculated in a method that adds the pixel voltage of the pixel to an absolute voltage difference between voltages applied to the pixel and opposing electrodes of the neighboring pixel when the neighboring pixel has a positive polarity, and subtracts the absolute voltage of the neighboring pixel from the pixel voltage of the pixel when the neighboring pixel has a negative polarity.

* * * * *